US010931558B2

(12) United States Patent
Nallavalli et al.

(10) Patent No.: US 10,931,558 B2
(45) Date of Patent: Feb. 23, 2021

(54) SCRIPT ACCELERATE

(71) Applicant: JPMorgan Chase Bank, N.A., New York, NY (US)

(72) Inventors: Rakesh Nallavalli, Powell, OH (US); Ashim Gomes, Westerville, OH (US); Priyadharshini Madhanagopal Vasanthi, Powell, OH (US); Kirk Vannest, Delaware, OH (US); Furqan Rehman, Dublin, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/199,955

(22) Filed: Nov. 26, 2018

(65) Prior Publication Data

US 2019/0166035 A1    May 30, 2019

Related U.S. Application Data

(60) Provisional application No. 62/590,953, filed on Nov. 27, 2017.

(51) Int. Cl.
*H04L 12/26* (2006.01)
*G06F 11/36* (2006.01)
*H04L 12/24* (2006.01)

(52) U.S. Cl.
CPC .......... *H04L 43/50* (2013.01); *G06F 11/3684* (2013.01); *G06F 11/3688* (2013.01); *H04L 41/0843* (2013.01); *H04L 41/0866* (2013.01); *H04L 41/18* (2013.01)

(58) Field of Classification Search
CPC . H04L 43/50; H04L 41/0843; H04L 41/0866; H04L 41/18; G06F 11/3684; G06F 11/3688
See application file for complete search history.

(56) References Cited

U.S. PATENT DOCUMENTS

| 5,565,316 A | * | 10/1996 | Kershaw | G09B 7/02 434/118 |
| 6,002,871 A | * | 12/1999 | Duggan | G06F 11/3664 714/38.12 |
| 6,601,232 B1 | * | 7/2003 | Burba | G01R 31/318307 707/999.2 |
| 6,609,128 B1 | * | 8/2003 | Underwood | G06F 9/454 707/610 |

(Continued)

*Primary Examiner* — William G Trost, IV
*Assistant Examiner* — Moishwar Mohan
(74) *Attorney, Agent, or Firm* — Greenblum & Bernstein, P.L.C.

(57) ABSTRACT

A system and method for dynamically generating scripts. The system includes at least a server device and a client device. The server device receives, from the client device, a request for generating a test script. The server device identifies parameter fields corresponding to the request. The client device provides a user interface based on the request, the user interface including the parameter fields corresponding to the request. The server device receives, a set of parameter inputs for the parameter fields and a selection of a testing tool. The server device retrieves, a test script template corresponding to the testing tool, and generates a test script based on the test script template retrieved by the server device and the set of parameter inputs received from the client device.

20 Claims, 7 Drawing Sheets

(56) References Cited

U.S. PATENT DOCUMENTS

| | | | | |
|---|---|---|---|---|
| 6,819,655 B1* | 11/2004 | Gregson | H04L 67/42 | 370/242 |
| 7,000,224 B1* | 2/2006 | Osborne, II | G06F 11/3688 | 714/738 |
| 8,185,877 B1* | 5/2012 | Colcord | G06F 9/44 | 717/124 |
| 9,047,414 B1* | 6/2015 | Matyjek | G06F 11/3688 | |
| 2003/0070119 A1* | 4/2003 | Dallin | G06F 11/3684 | 714/38.14 |
| 2004/0107415 A1* | 6/2004 | Melamed | G06F 11/3684 | 717/124 |
| 2005/0256665 A1* | 11/2005 | Hartmann | G06F 11/3684 | 702/121 |
| 2007/0168971 A1* | 7/2007 | Royzen | G06F 11/3688 | 717/124 |
| 2008/0126390 A1* | 5/2008 | Day | G06F 11/3414 | |
| 2012/0246515 A1* | 9/2012 | Lusenhop | G06F 11/3672 | 714/32 |
| 2013/0080832 A1* | 3/2013 | Dean | G16H 40/40 | 714/32 |
| 2014/0245070 A1* | 8/2014 | Rumble | G06F 11/3692 | 714/38.14 |
| 2014/0282407 A1* | 9/2014 | Channamsetti | G06F 11/3688 | 717/124 |
| 2014/0317601 A1* | 10/2014 | Patwardhan | G06F 11/3672 | 717/124 |
| 2015/0227452 A1* | 8/2015 | Raghavan | G06F 11/3684 | 717/124 |
| 2015/0254171 A1* | 9/2015 | Harden | G06F 11/3684 | 717/124 |
| 2015/0261824 A1* | 9/2015 | Jha | G06F 16/24564 | 707/690 |
| 2015/0301071 A1* | 10/2015 | Dhan | G01N 35/0092 | 702/108 |
| 2016/0283364 A1* | 9/2016 | Raghavan | G06F 11/3692 | |
| 2016/0328316 A1* | 11/2016 | Balsavias | G06F 11/3692 | |
| 2016/0342501 A1* | 11/2016 | Venkatesan | G06F 11/3684 | |
| 2017/0012852 A1* | 1/2017 | Shalev | H04L 43/18 | |
| 2017/0192880 A1* | 7/2017 | Ramakrishnan | G06F 11/3672 | |
| 2017/0228220 A1* | 8/2017 | Dai | G06F 11/3664 | |
| 2018/0109421 A1* | 4/2018 | Laribi | H04L 43/0817 | |
| 2018/0217921 A1* | 8/2018 | Palyekar | G06F 11/3684 | |
| 2018/0260310 A1* | 9/2018 | Vorganti | G06F 11/3684 | |
| 2018/0285248 A1* | 10/2018 | Gupta | G06F 11/3684 | |
| 2018/0322035 A1* | 11/2018 | Mohanty | G06F 11/3684 | |
| 2018/0373620 A1* | 12/2018 | Thomson | G06F 11/3684 | |

* cited by examiner

SCRIPT ACCELERATE

CROSS-REFERENCE TO RELATED APPLICATION(S)

The present application claims the benefit of U.S. Provisional Patent Application No. 62/590,953 filed on Nov. 27, 2017. The entire disclosure of the above-identified application, including the specifications, drawings and/or claims, is incorporated herein by reference in its entirety.

BACKGROUND

1. Field of the Disclosure

The present disclosure relates to the field of software application testing. More particularly, the present disclosure relates to behavioral or performance testing of software technologies using automated testing tools.

2. Background Information

A test script in software testing includes a set of instructions for execution on the software being tested in a testing environment. Automated testing may be often used to test a performance or behavior of the software being tested. Even for automated testing, various test scripts may be required to be written by skilled software developers, which may include extensive codes with multiple parameters. Also, the test scripts, which may be prone to errors, must be written correctly in order for the automated testing to be carried out properly. The different testing tools available in the marketplace may include Load Runner, JMeter, Selenium, Blaze Meter, Cucumber and many more, which may utilize different coding formats and parameters. Accordingly, software developers with existing knowledge of such testing tool protocols may be necessary for performing the automated testing.

Further, the process of manually writing these scripts with extensive codes is a very time consuming process as it requires long hours for coding such scripts and further requires additional time for identifying errors in the scripts and correcting the errors. In particular, this process of testing may be very inefficient, error prone and inconvenient for large sets of data. Currently, there is no automated system available that effectively and efficiently generate test scripts dynamically.

In addition, at least since the test scripts are generated by software developers on a client device, amount of test scripts generated on the client device may be quite large and its memory usage may be significant. Further, in an event that the test scripts are generated on the client device and then later transmitted to a testing environment server, the amount of data that has to be transmitted over the network may also be significant, and thus, may potentially contribute in congesting network traffic.

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1:
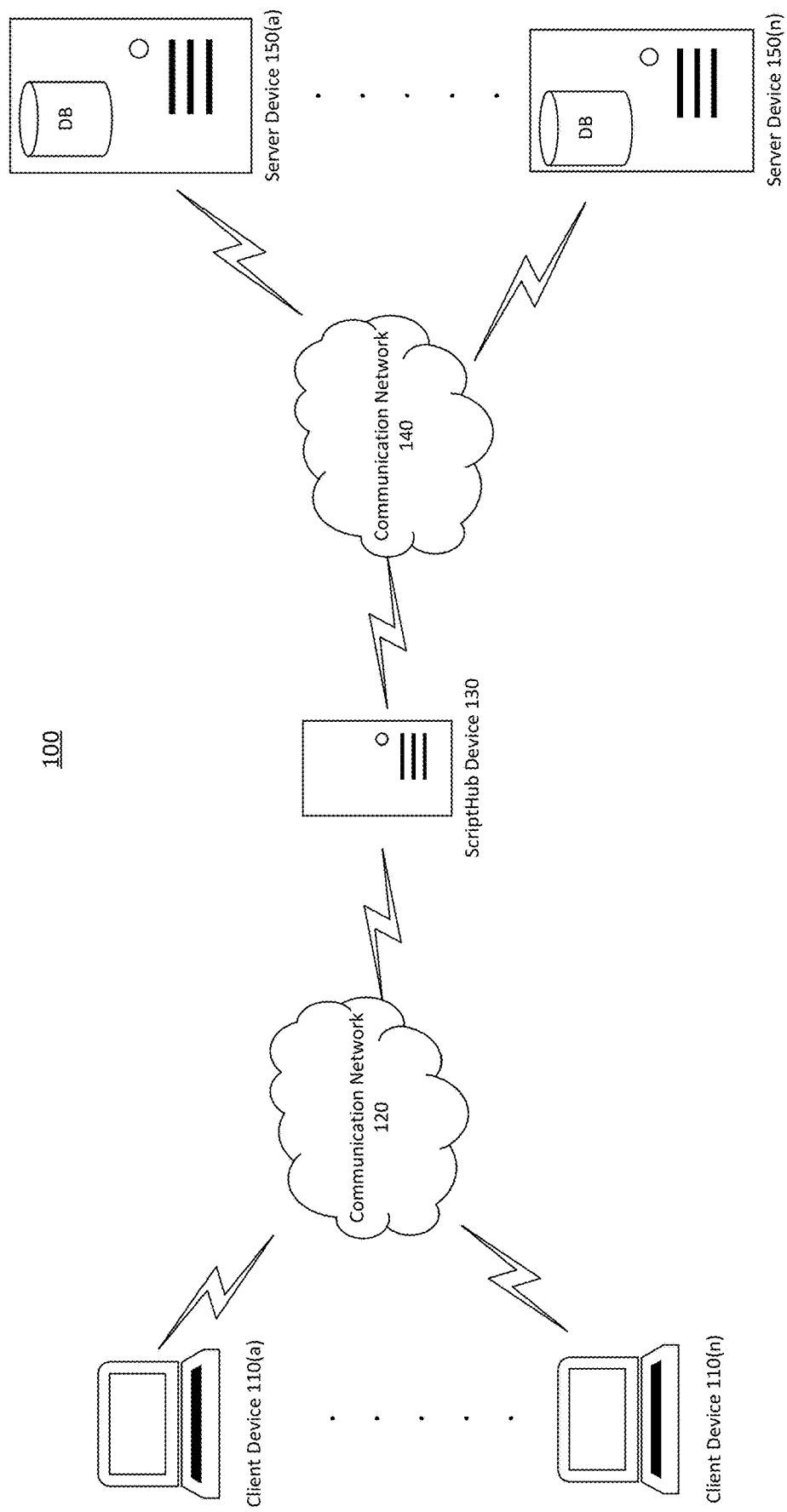
FIG. 1 shows an exemplary ScriptHub system, according to an aspect of the present disclosure.

FIG. 1 shows an exemplary ScriptHub system, according to an aspect of the present disclosure.

As exemplarily illustrated in FIG. 1, a ScriptHub system 100 includes one or more client devices 110(*a*) to 110(*n*), in which n is an integer. The ScriptHub system 100 further includes a communication network 120, a ScriptHub device 130, a communication network 140 and one or more server devices 150(*a*) to 150(*m*), in which m is an integer.

One or more of the client devices 110(*a*) to 110(*n*) may include, for example, a stationary computing device, a mobile computer, a computer system in a vehicle, a personal computer (PC), a laptop computer, a tablet computer, a wireless smart phone, a personal digital assistant (PDA), a communications device, a control system, a network router, switch or bridge, or any other machine capable of executing a set of instructions (sequential or otherwise) that specify actions to be taken by that machine. More specifically, the one or more of the client devices 110(*a*) to 110(*n*) may include any type of computing device that can facilitate the generation of scripts in response to user interaction with graphical user interfaces.

Further, one or more of the client devices 110(*a*) to 110(*n*) may include a processor, a memory, and a communication interface, which may be coupled together by a bus or other communication link, although other numbers and/or types of network devices could be used. The one or more client devices 110(*a*) to 110(*n*) may be incorporated as or in a particular device that in turn is in an integrated system that includes additional devices. In an example, one or more of the client devices 110(*a*) to 110(*n*) can be implemented using electronic devices that provide voice, video or data communication. The one or more of the client devices 110(*a*) to 110(*n*) may run one or more interface applications, such as standard web browsers or standalone client applications, which may provide an interface to communicate with the ScriptHub device 130 via the communication network 120 in order to transmit or communicate user requests. The one or more of the client devices 110(*a*) and 110(*n*) may further include a display device, such as a display screen or touchscreen, and/or an input device, such as a keyboard, for example.

In non-limiting aspects of the present disclosure, one or more of the communication network 120 and the communication network 140 can include local area network(s) (LAN(s)) or wide area network(s) (WAN(s)), and can use Transmission Control Protocol/Internet Protocol (TCP/IP) over Ethernet and industry-standard protocols, although other types and/or numbers of protocols and/or communication networks can be used. The communication networks 120 and 140 may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ScriptHub device 130 may include one or more processors, a memory, and/or a communication interface, which are coupled together by a bus or other communication link, although the ScriptHub device 130 can include other types and/or numbers of elements in other configurations. The processor(s) of the ScriptHub device 130 may execute programmed instructions stored in the memory for the any number of the functions described and illustrated herein. The processor(s) of the ScriptHub device 130 may include one or more CPUs or general purpose processors with one or more processing cores, for example, although other types of processor(s) can also be used.

The ScriptHub device 130 may store, in its memory, one or more applications that can include executable instructions that, when executed by the ScriptHub device 130, cause the ScriptHub device 130 to perform actions, such as to generate scripts, execute scripts, download scripts, transmit, receive, or otherwise process network protocols, for example, and to perform other actions exemplary described and illustrated in at least FIGS. 3-7. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the ScriptHub device itself, may be located in virtual server(s) running in a cloud-based computing environment rather than being tied to one or more specific physical network computing devices. Also, the application(s) may be running in one or more virtual machines (VMs) executing on the ScriptHub device. Additionally, in one or more embodiments of this technology, virtual machine(s) running on the ScriptHub device may be managed or supervised by a hypervisor.

Further, in non-limiting aspects of the present disclosure, the memory of the ScriptHub device may include a ScriptHub module. Further, the memory of the ScriptHub device may also include other rules, policies, modules, databases, or applications, and the like. The ScriptHub module in this example may be configured to facilitate generating test scripts based on determining a type of protocol and testing tool associated with the test script.

A test script may include a set of instructions, which may be written using a scripting or programming language. The test script may include an association between protocols with variable parameters specific to a testing tool or protocol type being utilized. The test scripts may be executed on a system in a testing environment to verify that the system performs according to expectations. The test scripts may be used in automated testing. Some of the scripting language used in automated testing may include, without limitation, C++, C#, Expect, JavaScript, Perl, Python, Ruby, Tcl, Unix Shell Script, VB script and the like. Further, there are other automated testing tools, which may require their own proprietary scripting language. However, due to a large number of variations in the testing tools available for automated testing and corresponding scripting language, certain organizations may be limited to certain testing tools as specialized skill may be necessary in generating test scripts for execution. Further, as performance of the automated testing is largely dependent on the quality of test scripts, care has to be provided in the preparation of the test scripts as inaccurate or faulty test scripts may render the automated testing ineffective. Accordingly, by limiting human interaction to entry of certain parameters, limited skill by the test script preparers may be necessary and accuracy of the generated test scripts may be improved. Further, although scripting language may vary from product to product, as input parameters may be similar or the same, organizations may have greater flexibility in incorporating various testing tools to provide more effective technical results.

The ScriptHub module further stores rules to associate protocols with input parameters fields and different types of testing tools. The protocols may include, by way of example, frontend protocols and backend protocols. The frontend protocols may be protocols utilized for communication at the client device and may include, by way of example, HTTP protocol. The backend protocols may be protocols utilized for communication at the server device and may include, by way of example, Transmission Control Protocol/Internet Protocol (TCP/IP), Message Queue transport protocol (MQ protocol), Lightweight Directory Access Protocol (LDAP), Database protocols although other types of protocols can also be used.

The stored rules may include, by way of example, rules for determining input parameter fields and testing tools based on indication of protocols received in a user request. According to a user request, the ScriptHub system will display input parameter fields and a listing of testing tools. Further, the ScriptHub system may associate input parameter fields and testing tools for each protocol, although other types of rules, techniques and methods can also be stored. The input parameters fields may include, by way of example, Socket Internet Protocol (Socket IP) Address, Socket Port, Extensible Markup language (XML) String, End point parameters, Internet Protocol (IP) Header information, Internet Protocol (IP) Body information, Database (DB) Port, DB Host, DB Alias, DB Account, DB Password, and Structured Query Language (SQL) Query. The ScriptHub system will use script templates to generate scripts associated with different testing tools. The script templates may be generated and stored by an administrative user in the template repository database of the server devices.

The different testing tools available in the marketplace which may include, by way of example, Load Runner, JMeter, Selenium, Blaze Meter, and Cucumber. However, aspects of the present disclosure are not limited thereto, such that other numbers and/or types of testing tools could be used. One or more testing tools available for selection may be displayed on a user interface. A testing tool may be displayed as a menu item, for example, as a button on the interface. The testing tool menu item, when clicked by the user, may execute a corresponding testing tool to generate an associated test script by utilizing the stored script templates.

The ScriptHub device 130 may be a standalone device or integrated with one or more other devices or apparatuses, such as one or more of the server devices, for example. In one particular example, the ScriptHub device 130 can include or be hosted by one of the server devices, and other arrangements are also possible. Moreover, one or more of the devices of the ScriptHub device 130 can be in a same or a different communication network including one or more public, private, or cloud networks, for example.

In non-limiting aspects of the present disclosure, one or more of the server devices 150(*a*) to 150(*n*) may include one or more processors, a memory, and a communication interface, which are coupled together by a bus or other communication link, although other numbers and/or types of network devices could be used. The one or more of the server devices 150(*a*) to 150(*n*) may process requests received from the ScriptHub device 130 via the communication network(s) 140 according to the HTTP-based and/or JavaScript Object Notation (JSON) protocol, for example, although other protocols can also be used.

The one or more of the server devices 150(*a*) to 150(*n*) may be a hardware or software or may represent a system with multiple servers in a pool, which may include internal or external networks. Further, the one or more of the server devices 150(*a*) to 150(*n*) devices may include web servers, application servers and data store servers. The one or more of the server devices 150(*a*) to 150(*n*) may host databases that are configured to store script templates, testing tools, user authentication and authorization information, and user roles configurations. The script templates may be stored in script template repositories. The script template repositories may be stored in the one or more of the server devices 150(*a*) to 150(*n*).

The script template repositories may store, by way of example, a plurality of template scripts. Each of the plurality of template scripts may be associated with a testing tool. The generated script templates are generated and stored by an administrative user in the template repository database of the server devices. The different testing tools may include, by way of example, Load Runner, JMeter, Selenium, Blaze Meter and Cucumber. However, aspects of the present disclosure are not limited thereto, such that other numbers and/or types of testing tools could be used. The ScriptHub utilize the stored script templates to generate scripts based on received user input.

The user authentication and authorization information may include, by way of example, user account information, user login information, username, password, although other numbers and/or types of user authentication and authorization information could be used. User roles configurations may include, by way of example, administrative roles, guest user roles, although other numbers and/or types of user roles configurations could be used. The administrative roles may include assigning a user account administrative rights, such as provide permissions to a user account to upload stored script templates, make updates to the stored scripts although other numbers and/or types of administrative roles could be used.

Although each of the server devices 150(*a*) to 150(*m*) is illustrated as a single device, one or more actions of each of the server devices 150(*a*) to 150(*m*) may be distributed across one or more distinct network computing devices that together include one or more of the server devices 150(*a*) to 150(*m*). Moreover, the server devices 150(*a*) to 150(*m*) are not limited to a particular configuration. Thus, one or more of the server devices 150(*a*) to 150(*m*) may contain a plurality of network computing devices that operate using a master/slave relationship, whereby one of the network computing devices of the server devices operate to manage and/or otherwise coordinate operations of the other network computing devices. Further, the one or more of the server devices 150(*a*) to 150(*m*) may utilized over a network of public, private and public-private cloud networks.

The one or more of the server devices 150(*a*) to 150(*m*) may operate, for example, as a plurality of network computing devices within cluster architecture, peer-to peer architecture, virtual machines, or within cloud architecture. However, aspects of the present disclosure are not limited thereto, such that other configurations and architectures may be implemented.

Although the exemplary network environment with the ScriptHub device, server devices, client devices, and communication network(s) are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment, such as the ScriptHub device, client devices, or server devices, for example, may be configured to operate as virtual instances on the same physical machine. In other words, one or more of the ScriptHub device, client devices, or server devices may operate on the same physical device rather than as separate devices communicating through communication network(s). Additionally, there may be more or fewer ScriptHub devices, client devices, or server devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 2:
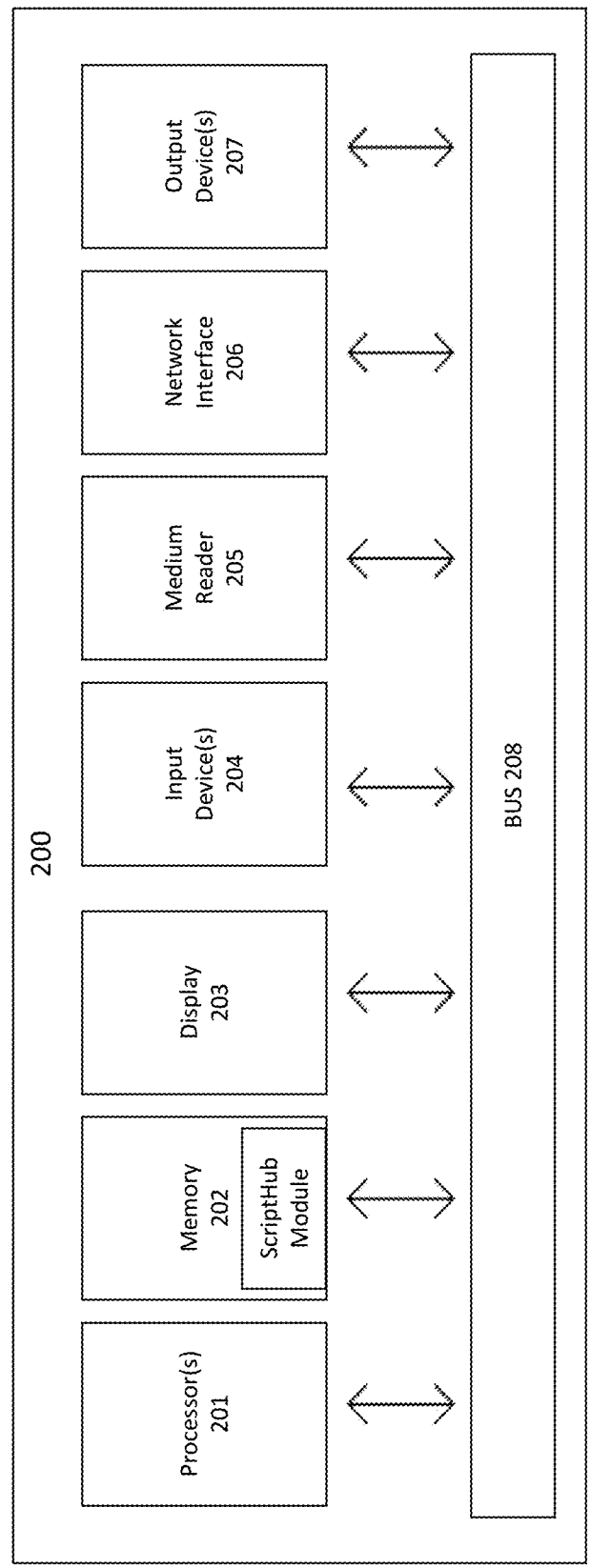
FIG. 2 shows an exemplary ScriptHub device, according to an aspect of the present disclosure.

FIG. 2 shows an exemplary ScriptHub device, according to an aspect of the present disclosure.

FIG. 2 is an illustrative embodiment of a general computer system, on which a ScriptHub device or module may be implemented, and which is shown and is designated 200. The computer system 200 can include a set of instructions that can be executed to cause the computer system 200 to perform any one or more of the methods or computer based functions disclosed herein. The computer system 200 may operate as a standalone device or may be connected, for example, using a communication network, to other computer systems or peripheral devices. Further, the computer system 200 may connect or communicate with other computer systems by short range communications, which may include, without limitation, near field communication (NFC), Bluetooth, radio frequency identification (RFID), or other communication technologies that allow direct communication with another computer system or device.

In a networked deployment, the computer system 200 may operate in the capacity of a server, a client user computer, or any computing device having at least a processor and a memory in a server-client user network environment, or as a peer computer system in a peer-to-peer (or distributed) network environment. The computer system 200 may operate in a network environment including an intermediary device for facilitating transactions with other computer systems, or in a peer-to-peer network environment without the intermediary device. The intermediary device may be a remote third party server residing on a network or a third party device that is not directly involved in a transaction between two computer systems or devices.

As illustrated in FIG. 2, the computer system 200 includes one or more processors 201. The processor 201 for a computer system 200 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 201 may be an article of manufacture and/or a machine component. The processor 201 for a computer system 200 is configured to execute software instructions in order to perform functions as described in the various embodiments herein. The processor 201 for a computer system 200 may be a general purpose processor or may be part of an application specific integrated circuit (ASIC). The processor 201 for a computer system 200 may also be a microprocessor, a microcomputer, a processor chip, a controller, a microcontroller, a digital signal processor (DSP), a state machine, or a programmable logic device. The processor 201 for a computer system 200 may also be a logical circuit, including a programmable gate array (PGA) such as a field programmable gate array (FPGA), or another type of circuit that includes discrete gate and/or transistor logic. The processor 201 for a computer system 200 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 200 includes a memory 202 that can communicate with each other via a bus 208. Further, the computer system 200 may access external memory via a network, such as a cloud network.

The memory 202 includes a ScriptHub Module, which may include a set of instructions that are to be executed by the one or more processors 201. For example, the ScriptHub module may be executed to, for example, generate scripts, execute scripts, download scripts, transmit, receive, or otherwise process network protocols. More specifically, the ScriptHub module, when executed, may generate and transmit a user interface to one or more of the client devices to receive various parameters for generating a test script. For example, the user interface may request a selection of a testing tool, and corresponding parameter inputs. The parameter inputs may include, without limitation, Socket Internet Protocol (Socket IP) Address, Socket Port, Extensible Markup language (XML) String, End point parameters, Internet Protocol (IP) Header information, Internet Protocol (IP) Body information, Database (DB) Port, DB Host, DB Alias, DB Account, DB Password, and Structured Query Language (SQL) Query. However, aspects of the present disclosure are not limited thereto, such that other parameters may be inputted.

Further, the ScriptHub module, may receive the parameters inputted to the user interface provided on the client device, and generate automated test scripts at the ScriptHub device. In an example, the ScriptHub module may be configured to facilitate generating test scripts based on determining a type of protocol and a type of testing tool associated with the test script based on the inputted parameters. The ScriptHub module further stores rules to associate protocols with input parameters fields and different types of testing tools. The protocols may include, by way of example, frontend protocols and backend protocols. The frontend protocols may be protocols utilized for communication at the client device and may include, by way of example, HTTP protocol. The backend protocols may be protocols utilized for communication at the server device and may include, by way of example, Transmission Control Protocol/Internet Protocol (TCP/IP), Message Queue transport protocol (MQ protocol), Lightweight Directory Access Protocol (LDAP), Database protocols although other types of protocols can also be used.

In an example, the memory 202 may additionally store one or more script templates. Each of the stored script templates may be associated with a testing tool. The generated script templates are generated and stored by an administrative user in the template repository database of the server devices. The different testing tools may include, by way of example, Load Runner, JMeter, Selenium, Blaze Meter and Cucumber. However, aspects of the present disclosure are not limited thereto, such that other numbers and/or types of testing tools could be used. The ScriptHub utilize the stored script templates to generate scripts based on received user input.

Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory (e.g., secure digital (SD) non-volatile memory card), electrically programmable read only memory (EPROM), electrically erasable programmable read-only memory (EEPROM), registers, a hard disk, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted.

As shown, the computer system 200 may further include (or may be connected to) a video display 203, such as a liquid crystal display (LCD), an organic light emitting diode (OLED), a flat panel display, a solid state display, or a cathode ray tube (CRT). Additionally, the computer system 200 may include an input device 204, such as a keyboard/virtual keyboard or touch-sensitive input screen or speech input with speech recognition, and a cursor control device, such as a mouse or touch-sensitive input screen or pad. Further, the input device 204 may additionally include a biometric input device, which may capture biometric information of a user. The biometric input device may include, without limitation, a finger print reader, a camera, an iris scanner, a microphone, and any other device that may capture biometric information of the user. The computer system 200 can also include a medium reader 205, a network interface 206, and one or more output devices 207.

In non-limiting aspects of the present disclosure, the medium reader 205 may include a computer-readable medium in which one or more sets of instructions, e.g. software, can be embedded. For example, the sets of instructions may be read from a computer-readable medium. Further, the instructions, when executed by a processor, can be used to perform one or more of the methods and processes as described herein. In a particular embodiment, the instructions may reside completely, or at least partially, within the memory 202, and/or within the one or more processors 201 during execution by the computer system 200.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface 206.

Figure 3:
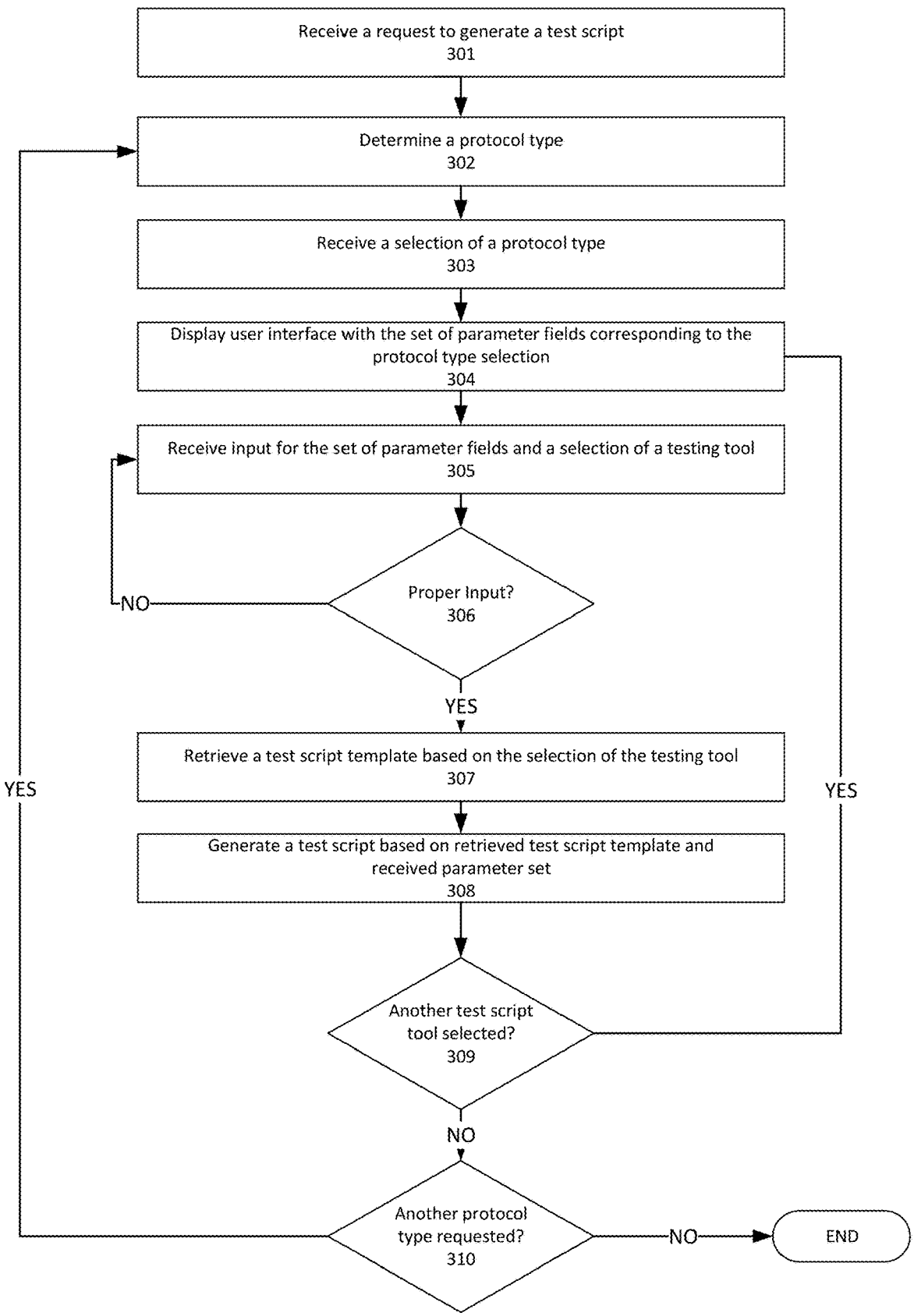
FIG. 3 shows an exemplary method for generating test scripts, according to an aspect of the present disclosure.

FIG. 3 shows an exemplary method for generating test scripts, according to an aspect of the present disclosure.

Referring more specifically to FIG. 3, in operation 301, the ScriptHub device receives a user input request to generate a test script. In an example, the ScriptHub device may reside on a network and receive the request from a client device. The network may include a cloud network, a local area network (LAN) or wide area network (WAN), and may be set to use Transmission Control Protocol/Internet Protocol (TCP/IP) over Ethernet and industry-standard protocols, although other types and/or numbers of protocols and/or communication networks can be used. The request may be transmitted to the Script Hub device when an end user launches a software application from the client device. The software application may be a device installed application or a web-based application.

In operation 302, the ScriptHub device determines a protocol type for the test script generation. In an example, a protocol type may be automatically determined based on prior history, or based on a user account profile. For example, certain employees belonging to a target organization may be defaulted to a particular protocol type. In another example, the ScriptHub device may determine a type of a protocol from a list of one or more types of protocols upon receiving a user selection input. Upon launching the software application, a list of one or more types of protocols may be displayed for selection. Each of the one or more types of protocols may be displayed, on a user interface, as a selectable menu item, such as an icon, a drop down selection, a radio button or the like. Each of these menu items may be associated with a type of protocol for which a script is to be generated. Further in an example, a listing of available protocol types may be user account specific, such that only users having proper credentials may be gain access to certain protocol types. Unavailable protocol types may be hidden from view, displayed different from other protocol types or configured not to be selectable.

In operation 303, the user interface provided on the client device receives a selection of a protocol type among the displayed list of protocol types. Further, when the user clicks on an icon associated with a particular protocol among the list of protocols, a corresponding user interface and/or parameter input set for display to the client device may be identified or determined. In an example, such determination may be made by the client device or by the ScriptHub device.

In operation 304, a user interface with the set of parameter fields corresponding to the selected protocol type may be displayed on the client device for receiving user input. In an example, user interfaces corresponding to the protocol types for selection may be stored over a network, such that code of the user interface maybe retrieved from a memory of a networked device for generation and display of the user interface on the client device. For example, the ScriptHub device may determine input parameter fields and types of testing tools to be displayed to the client device based on the selected protocol type. The input parameter fields and the testing tools to be displayed to the client device may correspond to or be associated with the protocol type selection. For example, the ScriptHub device may determine one or more input parameter fields and one or more types of testing tools based on the determined type of protocol associated with the user input request.

Further, individual testing tools corresponding to the protocol type selection may be displayed for receiving user selection. For example, testing tools may be displayed as selectable buttons, a selection field, a radio field, and the like. In addition, the testing tools may be displayed based on user permission, number of licenses available at time of use, and the like. In another example, user interfaces corresponding to the protocol types for selection may be stored at the client device, such that user interface may be retrieved from a memory of the client device upon receiving the selection. However, aspects of the present application are not limited thereto, such that certain user interface information may be stored at the client device level whereas other user interface information may be stored at the ScriptHub device.

In an exemplary embodiment, for a script associated with a TCP/IP protocol is requested to be generated, a user may click on a menu item, such as an icon, associated with a TCP/IP protocol for which the script is to be generated. Upon clicking on the icon associated with the TCP/IP protocol the interface, a corresponding user interface may be provided on the user interface at the client device for receiving inputs, such as field inputs and testing tool selection, corresponding to the selected protocol as exemplarily illustrated in FIG. 5. In this example, when the ScriptHub device determines a TCP/IP protocol to be associated with the user input request, then the input parameter fields associated with the TCP/IP protocol are determined. The determined input parameter fields associated with the TCP/IP protocol may include, without limitation, Socket IP Address, Socket Port and XML String. However, aspects of the present disclosure are not limited thereto, such that any other types of input parameter fields may be determined. Further, when the ScriptHub device determines a TCP/IP protocol to be associated with the user input request, then one or more testing tools associated with the TCP/IP protocol may be determined.

Figure 5:
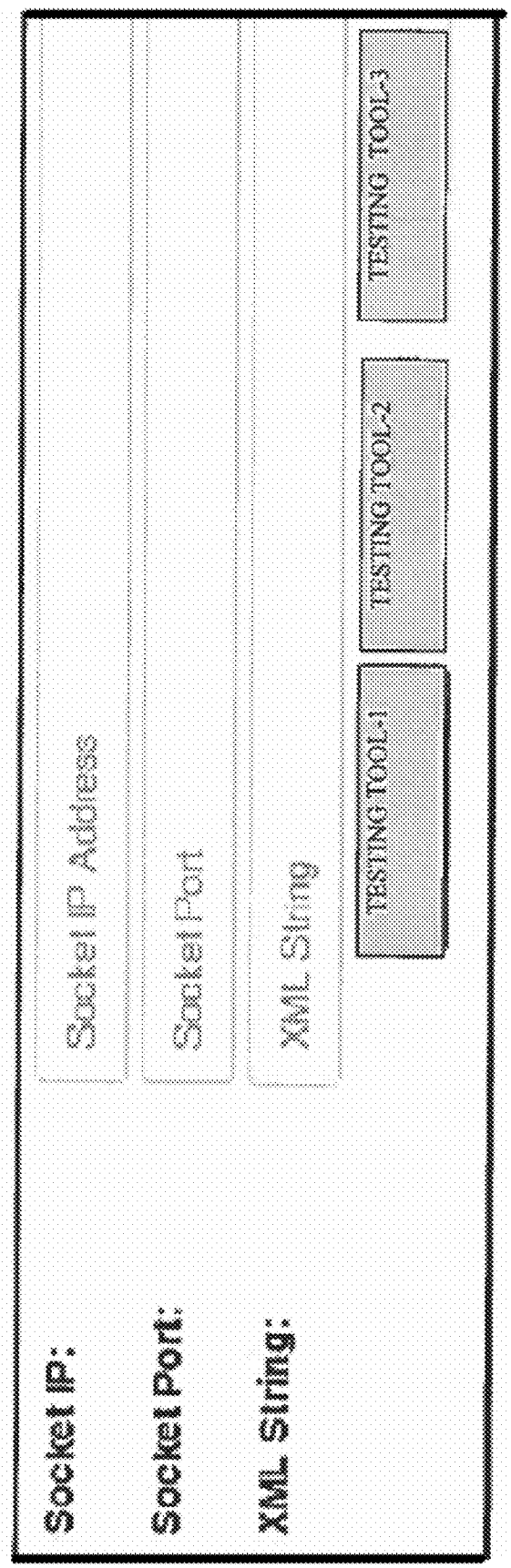
FIG. 5 shows an exemplary user interface for generating test scripts, according to an aspect of the present disclosure.

The testing tools may refer to tools that use user generated script templates to generate scripts associated with different testing tools. The user generated script templates may be generated and stored by an administrative user in the template repository database of the server devices. Referring to FIG. 5, the determined testing tools associated with the TCP/IP protocol includes the Testing Tool-1, Testing Tool-2 and Testing Tool-3. However, aspects of the present disclosure are not limited thereto, although any other types of testing tools may be determined.

In operation 305, user inputs for the provided parameter fields are received by the user interface. In an example, the inputted parameters may be transmitted to the ScriptHub device in real-time or at predetermined intervals. Further, the inputted parameters may be transmitted to the ScriptHub device in response to an operation of an input button. More specifically, the input parameters may be received from the user as inputs. The user may access the user interface and enter the data associated with the parameters in the associated displayed input parameter fields. In this example, when the ScriptHub device displays the user interface of FIG. 5, the user enters the parameters associated with the input parameter fields of Socket IP Address, Socket Port and XML String. In the Socket IP Address field the user may enters the IP address associated with the TCP/IP protocol Socket associated with the software application for which the script is to be generated. In the Socket Port field the user may enters the port number associated with the TCP/IP protocol Socket associated with the software application for which the script is to be generated. In the XML string field the user may enter the body XML string associated with the software application for which the script is to be generated.

In operation 306, the user interface may check whether proper inputs are provided for submission. For example, where certain parameter fields may have a fixed number of variability, such as number of socket ports available, a user's input of the parameters may be checked for propriety of the values being entered. Further, a proper format may be check for propriety. In an example, if an alphanumeric input is provided for a field requesting a numerical input, an error may be generated, such that improper parameters may not be submitted to the ScriptHub device prior to correction of the parameter entry. The user's input may be provided in real-time. By allowing entry of parameters to be checked prior to submission of the parameters for generation of test scripts, unnecessary network traffic, usage of processing power or other computer resources may be avoided. As results of the automated testing are largely dependent on accuracy and quality of the test scripts that are generated, verifying accuracy of script input may improve efficiency of the test script generation. Such ability to verify input in real-time was largely unavailable in conventional test scripting process since test scripts were in manually scripted by a software engineer. However, by utilizing the Script Hub system, accuracy of test script input information may be checked in real-time, resulting in more efficient and accurate test script generation and more efficient usage of resources. In operation 306, if it is determined that the parameter inputs received in operation 305 are valid or proper inputs, then the method proceeds to operation 307. Alternatively, in operation 306, if it is determined that the parameter inputs received in operation 305 are not valid or improper, the method repeats operation 305 until proper parameter inputs are received.

In operation 307, based on the received parameter inputs, which may include a selection of one or more testing tools, a test script template corresponding to the testing tool selection is retrieved. For example, the ScriptHub device may identify and retrieve a script template for the selected testing tool. In an example, the script template for various testing tools may be stored in a memory stored in the ScriptHub device or a database connected to the ScriptHub device. Further, the script templates may be stored in a database provided in a data store that may be connected via the communication network. In an example, a test script template may include various frontend protocols for calling certain functions and executing operations, and backend protocols for communicating with specified servers or databases for obtaining requested data. The test script templates may be specific to certain testing tool or may be common across multiple tools. Further in an example, the test script templates may be pre-defined or may be programmable for customization. In addition, the test script templates may be protocol type specific.

In an example, script template repositories may reside over a communication network and store various script templates. Each of the plurality of template scripts may be associated with a testing tool. The generated script templates are generated and stored by an administrative user in the template repository database of the server devices. The different testing tools may include, by way of example, Load Runner, JMeter, Selenium, Blaze Meter and Cucumber. However, aspects of the present disclosure are not limited thereto, such that other numbers and/or types of testing tools could be used. The ScriptHub utilize the stored script templates to generate scripts based on received user input.

In operation 308, the ScriptHub device generates a test script based on the retrieved script template and the inputted parameter set transmitted by the client device. In an example, the test script may be generated by combining the inputted parameters with the retrieved script template. The ScriptHub device may insert the received parameter inputs into various portions of the retrieved script template for generating the test script. However, aspects of the present disclosure are not limited thereto, such that the ScriptHub device modify certain portions of the script template based on the inputted parameters.

The ScriptHub device may generate test scripts based on stored templates associated with the selected type of testing tool. In an example, when Testing Tool-2 icon corresponding to the JMeter testing tool is selected as a testing tool, then the Testing Tool-2 utilizes templates associated with a JMeter testing tool stored in the template repository at the server devices to generate scripts that are compatible with JMeter testing tool. Further in this example, when the Testing Tool-1 icon corresponding to the Load Runner testing tool is selected as a testing tool, then the Testing Tool-1 utilizes templates associated with the Load Runner testing tool stored in the template repository at the server devices to generate scripts that are compatible with Load Runner testing tool. Further, when the Testing Tool-3 icon corresponding to the Selenium testing tool is selected as a testing tool, then the Testing Tool-3 utilizes templates associated with the Selenium testing tool stored in the template repository at the server devices to generate scripts that are compatible with Selenium testing tool. The ScriptHub device upon generating the script may cause the testing tool associated with the selected testing tool icon to execute the generated script automatically. Alternatively, the ScriptHub device may store the generated script prior to execution. In an example, the Testing Tool-2 may generate the script and cause the generated script to be executed in the JMeter testing tool.

In operation 309, the ScriptHub device determines whether another testing tool icon is selected after the test script is generated in operation 308. If the user selects to select another test tool in operation 309, the method proceeds to operation 304 for displaying the user interface with various parameter fields. In an example, the initially inputted parameters may remain on the user interface, which may allow the user to simply select another testing tool icon for generating another test script based on the newly selected testing tool. Further, the inputted parameters may be saved for later execution. Alternatively, the parameter fields for the user interface may be cleared out. However, aspects of the present disclosure are not limited thereto, such that multiple tools may be selected contemporaneously based on the same parameter inputs. Further, if a test script has been generated using, for example, Testing Tool-1, the Testing Tool-1 icon may be grayed out if another test script is to be generated using another testing tool with the same parameter set.

If the user selects not to select another test tool in operation 309, the method proceeds to operation 310 for inquiring whether another protocol type is to be requested.

In operation 310, the user is inquired whether another protocol type is to be selected. For example, a screen for selecting yes or no to the inquiry may be presented. If the user selects to proceed with the selecting of another protocol type, then the method proceeds to operation 302. If the user selects not to proceed with the selecting of another protocol type, the method terminates.

Alternatively, upon generation of the test script in operation 308, a selection screen for selecting another testing tool and/or another protocol type may be presented. Further, the selection screen may allow the user to select a particular testing tool or a protocol type for a more streamlined process. However, aspects of the present disclosure are not limited thereto, such that other methods for obtaining such selection information may be utilized.

Figure 4:
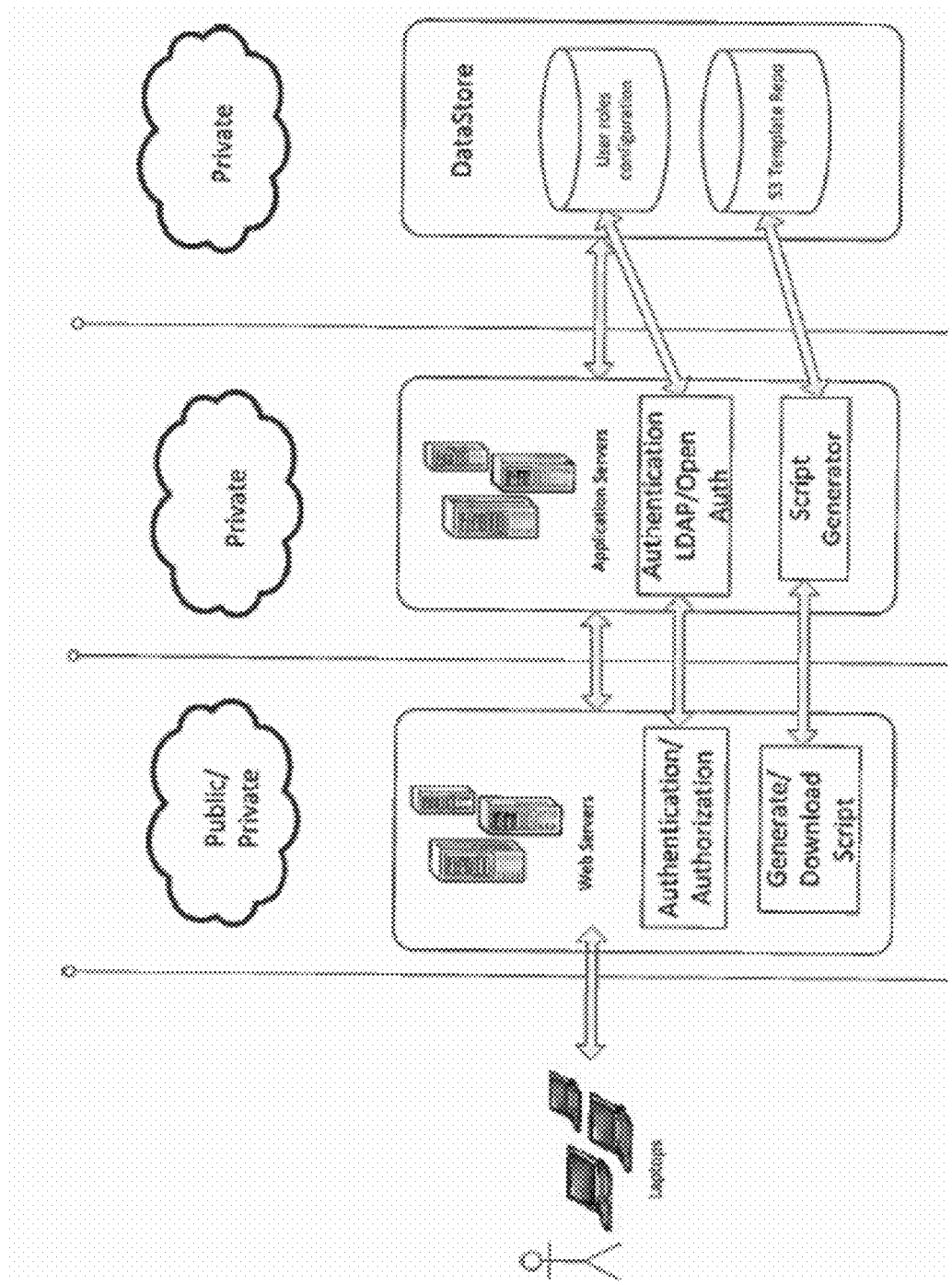
FIG. 4 shows an exemplary process flow for generating test scripts, according to an aspect of the present disclosure.

FIG. 4 shows an exemplary process flow for generating test scripts, according to an aspect of the present disclosure.

As exemplarily illustrated in FIG. 4, a user may request to generate a test script using a client device, such as a laptop. The submitted request is transmitted through a communication network to access a public or private network to access one or more web servers. The web servers, upon receiving the request may initially request authentication from the requesting device. More specifically, the web servers residing on the public or private network may request authentication information from one or more application servers residing on a private network. Authentication via authentication lightweight directory access protocol (LDAP) or open authentication may be utilized for authenticating user credentials transmitted from the client device. LDAP may be an open, vendor-neutral application protocol for accessing and maintaining distributed direction information services over an Internet Protocol (IP) network. Directory services may allow sharing of information about users, systems, networks, services, and applications throughout the network. The one or more application servers may access the data store via the authentication LDAP to access data storing various user roles configuration, username and passwords. Upon accessing the database, and finding a match for the user credentials for the laptop, results of the authentication is determined by the application servers and transmitted to the requesting web servers. Upon determination of the authenticated status of the laptop requesting access, the web server authorizes access to the requesting laptop.

Once the laptop has been authenticated, the laptop may be provided with a web-based tool for selecting various parameters for generating a test script. In an example, a set of parameters may be provided based on a selection of a testing tool. Alternatively, a set of parameters may be provided without regard to an initial selection of a testing tool. Similarly, a set of parameters may be entered and applied across multiple testing tools that may be selected. Further, entry of parameters may be saved as a file, which may be retrieved and reused.

The entered parameters may be transmitted to the web servers via a communication network. The web servers in turn may access a script generator stored at one or more application servers for generating a test script requested by the laptop. The application servers may in turn access or retrieve a script template for the selected testing tool from a S3 Template Repository database provided in the data store. The S3 Template Repository database may store, by way of example, various script templates. Each of the plurality of template scripts may be associated with a testing tool. The generated script templates are generated and stored by an administrative user in the template repository database of the server devices. The different testing tools may include, by way of example, Load Runner, JMeter, Selenium, Blaze Meter and Cucumber. However, aspects of the present disclosure are not limited thereto, such that other numbers and/or types of testing tools could be used. The ScriptHub utilize the stored script templates to generate scripts based on received user input.

The application servers may utilize parameter set received from the laptop and the script template retrieved from the data store for generating a test script. In an example, the ScriptHub device may insert the received parameter inputs into various portions of the retrieved script template for generating the test script. However, aspects of the present disclosure are not limited thereto, such that the ScriptHub device modify certain portions of the script template based on the inputted parameters. The generated test script may be downloaded via the web server, or may be executed directly at a testing environment of a software to be tested. In an example, the generated test script may include an association between protocols with variable parameters specific to a testing tool or protocol type being utilized.

Accordingly, the ScriptHub system may utilize a distributed architecture to combine various parameters received from the laptop and a test script template retrieved from a network data store for generating a test script at a server. Based on such configuration, memory usage at the client device may be significantly reduced. For example, such configuration for one testing tool exhibited allowed a memory usage at the client device to be reduced by more than 60%. Accordingly, a lighter client device may be utilized for test script generation than conventionally required. Further, since the laptop is limited to transmitting only the parameters, as opposed to the full test scripts, no pre-existing knowledge of the user is required for generating for a testing tool regardless of the testing tool being utilized for testing of the software. Also, network traffic may be significantly reduced as only the parameters are being transmitted from the laptops, as opposed to the full test scripts.

FIG. 5 shows an exemplary user interface for generating test scripts, according to an aspect of the present disclosure.

As illustrated in FIG. 5, a user interface for providing various parameters for generating a test script is provided. In an example, the user interface may be a web-based or may be provided by a client installed application. In the user interface, an option to select a testing tool among multiple testing tools is provided. Testing tools available for execution may be provided on the user interface for selection. The testing tool may be selected prior to entry of the parameter fields of subsequent to entry of the parameter fields.

The parameter set may be tool specific or may be generic to all of the testing tools that are available for selection. As exemplarily illustrated, the parameter fields may include Socket Internet Protocol (Socket IP) Address, Socket Port, and Extensible Markup language (XML) String. However, aspects of the present disclosure are not limited thereto, such that other parameter fields may be provided for entry. Further, although not illustrated, parameter fields entered may be saved for later execution or repeated execution. In addition, the parameter fields may be utilized for multiple testing tools.

Further, as the user interface limits entry of select number of inputs, which may have a fixed number of variability, such as number of socket ports available, a user's input of the parameters may be checked for propriety of the values being entered. More specifically, the user's input may be provided in real-time and checked to verify whether the parameter being inputted is a valid value or not. In an example, valid input values or value ranges may be provided on the client device itself or provided on a server to be checked against. By allowing entry of parameters to be checked prior to submission of the parameters for generation of test scripts, unnecessary network traffic, usage of processing power or other computer resources may be avoided. As results of the automated testing are largely dependent on accuracy and quality of the test scripts that are generated, verifying accuracy of script input improves efficiency of the test script generation. Such ability to verify input in real-time was largely unavailable in conventional test scripting process as test scripts were in manually scripted by a software engineer. However, by utilizing the Script Hub system, accuracy of test script input information may be checked in real-time, resulting in more efficient and accurate test script generation and more efficient usage of resources.

Upon completed entry of the parameter fields and selection of the testing tool, the parameter fields may be transmitted over to a server device for generation of a test script based on the provided parameter fields. For example, the server device may retrieve a test script template corresponding to the selection of the testing tool, and combine the information provided in the test script template with the provided parameter fields to generate meaningful data set that may be utilized for testing of a particular software program. At least because a client device is limited to providing or transmitting of parameters for generating the test scripts, a light client device may be utilized due to reduced memory usage and network usage may be more efficient, since less data is transmitted from the client device to the server device. Further, at least since the client device is limited to providing of parameter fields, no pre-existing knowledge of any frontend or backend protocol for the testing tool to be used is necessary. Accordingly, less skilled employees may be utilized without having to rely on an experienced software engineer.

Figure 6:
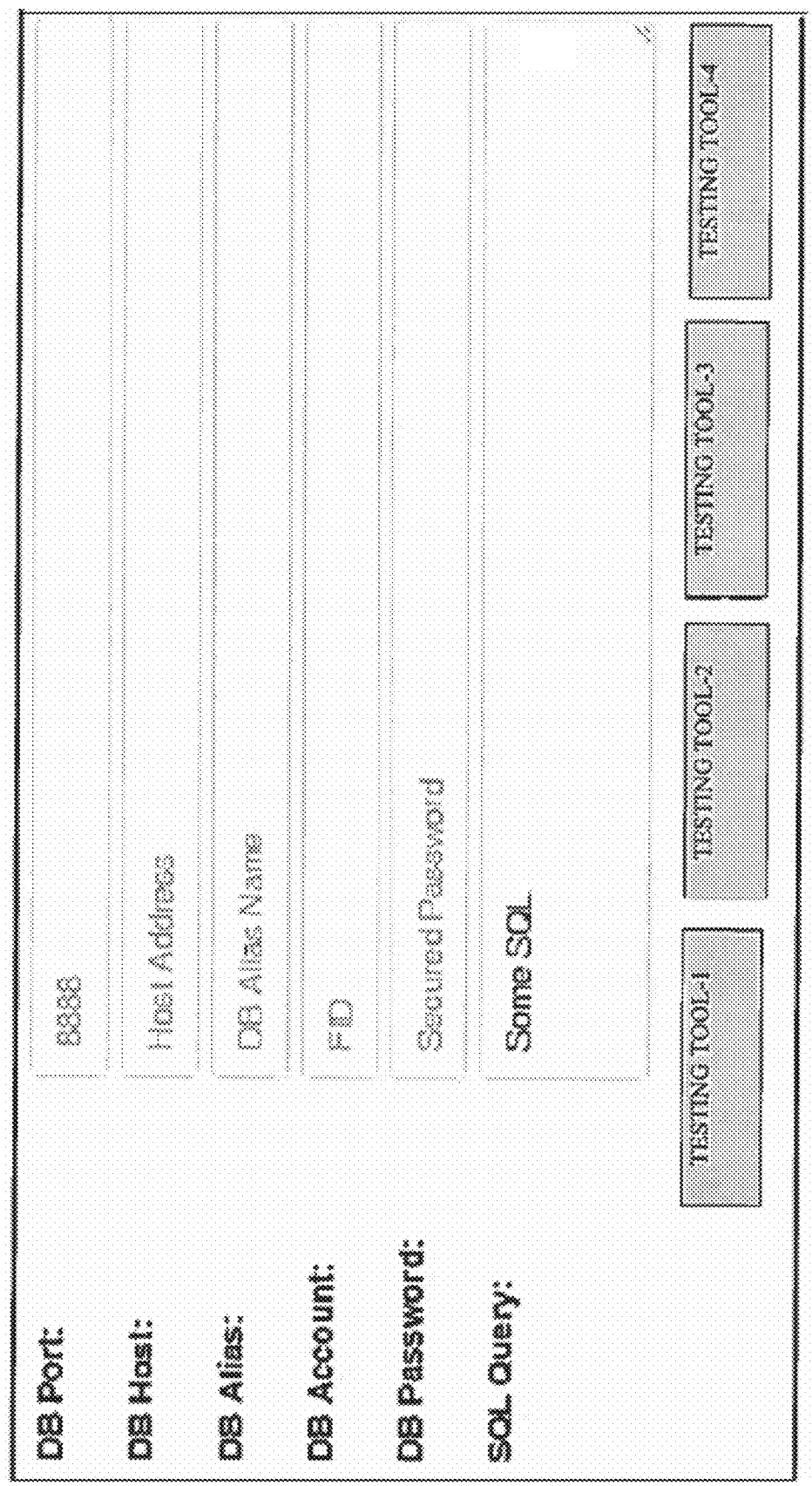
FIG. 6 shows an exemplary user interface for generating test scripts, according to an aspect of the present disclosure.

FIG. 6 shows an exemplary user interface for generating test scripts, according to an aspect of the present disclosure.

As illustrated in FIG. 6, another user interface for providing various parameters for generating a test script is provided. In an example, the user interface may be a web-based or may be provided by a client installed application. In the user interface, an option to select a testing tool among multiple testing tools is provided. Testing tools available for execution may be provided on the user interface for selection. The testing tool may be selected prior to entry of the parameter fields of subsequent to entry of the parameter fields.

The parameter set may be tool specific or may be generic to all of the testing tools that are available for selection. As exemplarily illustrated, the parameter fields may include Database (DB) Port, DB Host, DB Alias, DB Account, DB Password, and Structured Query Language (SQL) Query. However, aspects of the present disclosure are not limited thereto, such that other parameter fields may be provided for entry. Further, although not illustrated, parameter fields entered may be saved for later execution or repeated execution. In addition, the parameter fields may be utilized for multiple testing tools.

Further, as the user interface limits entry of select number of inputs, which may have a fixed number of variability, such as number of database ports available, a user's input of the parameters may be checked for propriety of the values being entered. More specifically, the user's input may be provided in real-time and checked to verify whether the parameter being inputted is a valid value or not. In an example, valid input values or value ranges may be provided on the client device itself or provided on a server to be checked against. By allowing entry of parameters to be checked prior to submission of the parameters for generation of test scripts, unnecessary network traffic, usage of processing power or other computer resources may be avoided. As results of the automated testing are largely dependent on accuracy and quality of the test scripts that are generated, verifying accuracy of script input improves efficiency of the test script generation. Such ability to verify input in real-time was largely unavailable in conventional test scripting process as test scripts were in manually scripted by a software engineer. However, by utilizing the Script Hub system, accuracy of test script input information may be checked in real-time, resulting in more efficient and accurate test script generation and more efficient usage of resources.

Upon completed entry of the parameter fields and selection of the testing tool, the parameter fields may be transmitted over to a server device for generation of a test script based on the provided parameter fields. For example, the server device may retrieve a test script template corresponding to the selection of the testing tool, and combine the information provided in the test script template with the provided parameter fields to generate meaningful data set that may be utilized for testing of a particular software program. At least because a client device is limited to providing or transmitting of parameters for generating the test scripts, a light client device may be utilized due to reduced memory usage and network usage may be more efficient, since less data is transmitted from the client device to the server device. Further, at least since the client device is limited to providing of parameter fields, no pre-existing knowledge of any frontend or backend protocol for the testing tool to be used is necessary. Accordingly, less skilled employees may be utilized without having to rely on an experienced software engineer.

Figure 7:
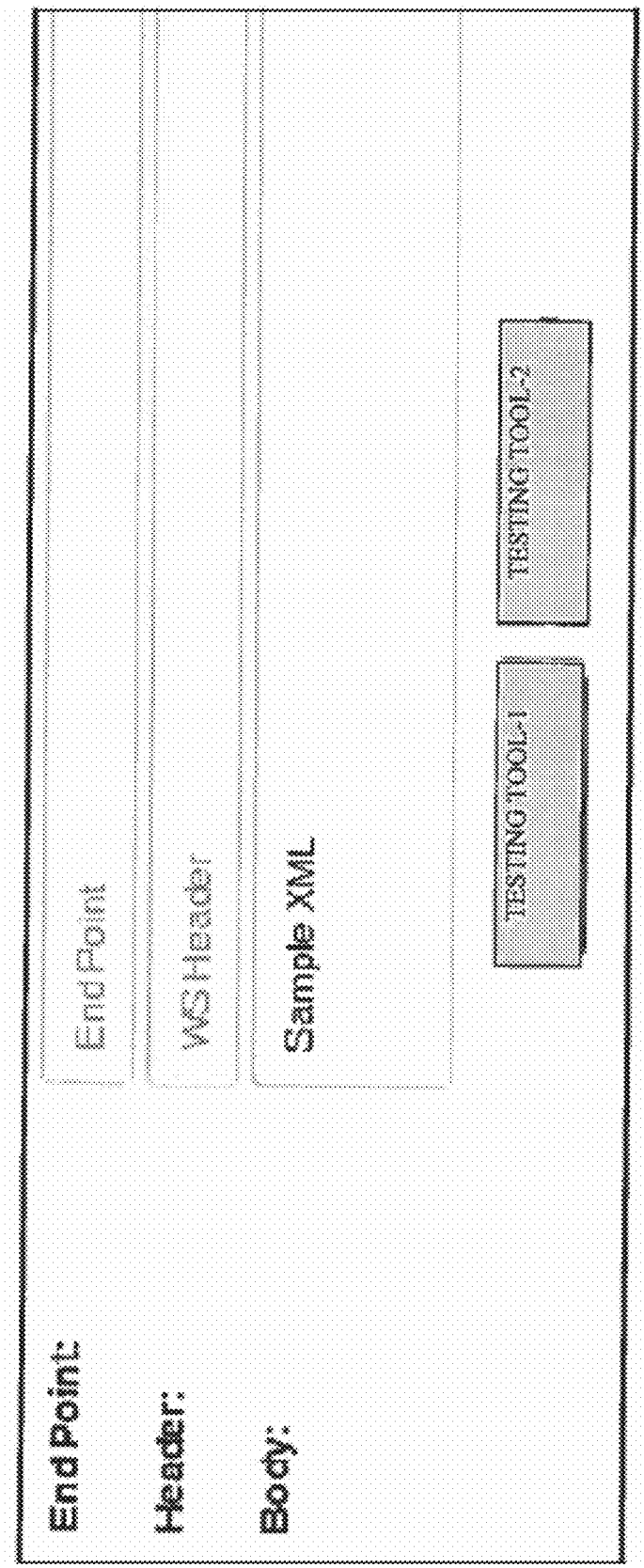
FIG. 7 shows an exemplary user interface for generating test scripts, according to an aspect of the present disclosure.

FIG. 7 shows an exemplary user interface for generating test scripts, according to an aspect of the present disclosure.

As illustrated in FIG. 7, another user interface for providing various parameters for generating a test script is provided. In an example, the user interface may be a web-based or may be provided by a client installed application. In the user interface, an option to select a testing tool among multiple testing tools is provided. Testing tools available for execution may be provided on the user interface for selection. The testing tool may be selected prior to entry of the parameter fields of subsequent to entry of the parameter fields.

Further, as the user interface limits entry of select number of inputs, which may have a fixed number of variability, a user's input of the parameters may be checked for propriety of the values being entered. More specifically, the user's input may be provided in real-time and checked to verify whether the parameter being inputted is a valid value or not. In an example, valid input values or value ranges may be provided on the client device itself or provided on a server to be checked against. By allowing entry of parameters to be checked prior to submission of the parameters for generation of test scripts, unnecessary network traffic, usage of processing power or other computer resources may be avoided. As results of the automated testing are largely dependent on accuracy and quality of the test scripts that are generated, verifying accuracy of script input improves efficiency of the test script generation. Such ability to verify input in real-time was largely unavailable in conventional test scripting process as test scripts were in manually scripted by a software engineer. However, by utilizing the Script Hub system, accuracy of test script input information may be checked in real-time, resulting in more efficient and accurate test script generation and more efficient usage of resources.

The parameter set may be tool specific or may be generic to all of the testing tools that are available for selection. As exemplarily illustrated, the parameter fields may include End point parameters, Internet Protocol (IP) Header information, and Internet Protocol (IP) Body information. However, aspects of the present disclosure are not limited thereto, such that other parameter fields may be provided for entry. Further, although not illustrated, parameter fields entered may be saved for later execution or repeated execution. In addition, the parameter fields may be utilized for multiple testing tools.

Upon completed entry of the parameter fields and selection of the testing tool, the parameter fields may be transmitted over to a server device for generation of a test script based on the provided parameter fields. For example, the server device may retrieve a test script template corresponding to the selection of the testing tool, and combine the information provided in the test script template with the provided parameter fields to generate meaningful data set that may be utilized for testing of a particular software program. At least because a client device is limited to providing or transmitting of parameters for generating the test scripts, a light client device may be utilized due to reduced memory usage and network usage may be more efficient, since less data is transmitted from the client device to the server device. Further, at least since the client device is limited to providing of parameter fields, no pre-existing knowledge of any frontend or backend protocol for the testing tool to be used is necessary. Accordingly, less skilled employees may be utilized without having to rely on an experienced software engineer.

According to non-limiting aspects of the present application, exemplary embodiments of the ScriptHub system may utilize a distributed architecture to combine inputted parameters received from one or more client devices and a corresponding test script template retrieved from a network data store for generating a test script. Based on such configuration, memory usage at the client device may be significantly reduced. For example, such configuration for one testing tool exhibited allowed a memory usage at the client device to be reduced by more than 60%. Accordingly, test scripts may be generated by the client device by utilizing less memory for more efficient use of the client device. In view of reduced memory requirements, a lighter client device may be utilized for test script generation than conventionally required. Further, since the laptop is limited to transmitting only the parameters, as opposed to the full test scripts, no pre-existing knowledge of the user is required for generating for a testing tool regardless of the testing tool being utilized for testing of the software. Also, network traffic may be significantly reduced as only the parameters are being transmitted from the laptops, as opposed to the full test scripts. Accordingly, computer network congestion may also be reduced by use of exemplary configurations described above.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

As described above, according to an aspect of the present disclosure, a system for dynamically generating test scripts is provided for quality assurance testing of software products. The system includes at least a client device and a server device. The client device is configured to transmit, over a communication network to a server device, a request to generate a test script, provide a user interface based on the request, the user interface including a plurality of parameter fields corresponding to the request, receive a set of parameters inputs via the user interface, receive a selection of a testing tool, and transmit, to the server device, the set of parameter inputs and the selection of the testing tool. The server device is configured to receive the request from the client device, identify the plurality of parameter fields corresponding to the request, receive, from the client device, the set of parameter inputs for the plurality of parameter fields, retrieve a test script template corresponding to the selection of the testing tool, and generate a test script based on the test script template retrieved with the set of parameter inputs received from the client device.

According to another aspect of the present disclosure, the client device is further configured to display the user interface with the plurality of parameter fields.

According to another aspect of the present disclosure, the server device is further configured to transmit, to the client device, data for generating the user interface. Also, the client device is further configured to generate the user interface using the data.

According to another aspect of the present disclosure, the test script is generated by combining the set of parameter inputs with the test script template retrieved.

According to another aspect of the present disclosure, the combining includes inserting the set of parameter inputs received into the test script template retrieved.

According to another aspect of the present disclosure, the test script is generated by modifying the test script template based on the set of parameter inputs received from the client device.

According to another aspect of the present disclosure, the server device is configured to determine a validity of one or more of the parameter inputs transmitted by the client device, and to transmit a request to input corrected parameters if the one or more of the parameter inputs are determined to be invalid.

According to another aspect of the present disclosure, the server device is configured to determine the validity of one or more the parameters transmitted by the client device before attempting to generate the test script.

According to another aspect of the present disclosure, the validity of one or more parameter inputs is determined in real-time.

According to another aspect of the present disclosure, the client device is further configured to transmit, over the communication network to the server device, authentication information. In addition, the server device is further configured to identify the plurality of parameter fields after the authentication information provided by the client device has been verified.

According to another aspect of the present disclosure, the request includes a selection of a protocol type.

According to another aspect of the present disclosure, the server device is further configured to identify a list of testing tools available for execution based on the protocol type.

According to another aspect of the present disclosure, the user interface is specific to the testing tool selected and a protocol type.

According to another aspect of the present disclosure, the server device is further configured to execute the generated test script.

According to another aspect of the present disclosure, the server device is further configured to transmit, to another server device in a testing environment, the generated test script.

According to another aspect of the present disclosure, the server device retrieves the test script template from a memory of the server.

According to another aspect of the present disclosure, the system includes a database connected to the server device via another communication network. Further, the server device retrieves the test script template from the database.

According to another aspect of the present disclosure, one or more of the parameters inputs are saved in a memory of the client device.

According to an aspect of the present disclosure a method for dynamically generating test scripts in a distributed system architecture is provided for quality assurance testing of software products. The distributed system includes at least a client device and a server device connected via a communication network. The method includes receiving, at the server device from the client device, a request for generating a test script; identifying, by the server, a plurality of parameter fields corresponding to the request; providing, to the client device, a user interface based on the request, the user interface including the plurality of parameter fields corresponding to the request; receiving, at the server device from the client device, a set of parameter inputs for the plurality of parameter fields; receiving, at the server device from the client device, a selection of a testing tool; retrieving, by the server, a test script template corresponding to the testing tool; and generating, by the server, a test script based on the test script template retrieved by the server device and the set of parameter inputs received from the client device.

According to an aspect of the present disclosure a tangible non-transitory computer readable storage medium that stores a computer program, the computer program, when executed by a processor, causing a computer apparatus to perform a process in a distributed system architecture including a client device and a server device connected via a communication network. The process includes receiving, at the server device from the client device, a request for generating a test script; identifying, by the server, a plurality of parameter fields corresponding to the request; providing, to the client device, a user interface based on the request, the user interface including the plurality of parameter fields corresponding to the request; receiving, at the server device from the client device, a set of parameter inputs for the plurality of parameter fields; receiving, at the server device from the client device, a selection of a testing tool; retrieving, by the server, a test script template corresponding to the testing tool; and generating, by the server, a test script based on the test script template retrieved by the server device and the set of parameter inputs received from the client device.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person ordinarily skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system for dynamically generating test scripts, the system comprising:
    a client device configured to
        transmit, over a communication network to a server device, a request from a user to generate a test script, the request including a selection of a protocol type from among a plurality of candidate protocol types,
        display a user interface based on the request, the user interface including a plurality of parameter fields relating to the protocol type corresponding to the request,
        receive a set of parameters inputs relating to the test script via the user interface,
        verify the set of parameters inputs in real-time based on a predetermined number of variability and a predetermined format,
        receive a selection of a testing tool from among a plurality of candidate testing tools displayed on the user interface, the plurality of candidate testing tools determined automatically based on scripting language compatibility between each of the plurality of candidate testing tools and the selected protocol type, and
        transmit, to the server device, the set of parameter inputs and the selection of the testing tool; and
    the server device configured to
        automatically determine the plurality of candidate protocol types for the user based on a prior testing history of the user and an account profile of the user,
        receive the request from the client device,
        identify the plurality of parameter fields corresponding to the request,
        receive, from the client device, the set of parameter inputs for the plurality of parameter fields,
        retrieve a test script template corresponding to the selection of the testing tool, and
        generate a test script based on the test script template retrieved by the server device and the set of parameter inputs received from the client device.

2. The system of claim 1,
    wherein the client device is further configured to display the user interface with the plurality of parameter fields.

3. The system of claim 1,
    wherein the server device is further configured to transmit, to the client device, data for generating the user interface, and
    wherein the client device is further configured to generate the user interface using the data.

4. The system of claim 1,
    wherein the test script is generated by combining the set of parameter inputs with the test script template retrieved.

5. The system of claim 4,
    wherein the combining comprises inserting the set of parameter inputs received into the test script template retrieved.

6. The system of claim 1,
    wherein the test script is generated by modifying the test script template based on the set of parameter inputs received from the client device.

7. The system of claim 1,
    wherein the server device is configured to determine a validity of one or more of the parameter inputs transmitted by the client device, and to transmit a request to input corrected parameters if the one or more of the parameter inputs are determined to be invalid.

8. The system of claim 7,
    wherein the server device is configured to determine the validity of one or more the parameter inputs transmitted by the client device before attempting to generate the test script.

9. The system of claim 7,
    wherein the validity of one or more parameter inputs is determined in real-time.

10. The system of claim 1,
    wherein the client device is further configured to transmit, over the communication network to the server device, authentication information, and
    wherein the server device is further configured to identify the plurality of parameter fields after the authentication information provided by the client device has been verified.

11. The system of claim 1,
    wherein the protocol type relates to the test script.

12. The system of claim 11,
    wherein the server device is further configured to identify a list of testing tools available for execution based on the protocol type.

13. The system of claim 11,
    wherein the user interface is specific to the testing tool selected and the protocol type.

14. The system of claim 1,
    wherein the server device is further configured to execute the generated test script.

15. The system of claim 1,
    wherein the server device is further configured to transmit, to another server device in a testing environment, the generated test script.

16. The system of claim 1,
wherein the server device retrieves the test script template from a memory of the server.

17. The system of claim 1,
wherein the server device retrieves the test script template from a database residing on another communication network.

18. The system of claim 1,
wherein one or more of the parameters inputs are saved in a memory of the client device.

19. A method for dynamically generating scripts in a distributed system architecture including a client device and a server device connected via a communication network, the method comprising:

automatically determining, by the server device, a plurality of candidate protocol types for a user based on a prior testing history of the user and an account profile of the user;

receiving, at the server device from the client device, a request from the user for generating a test script, the request including a selection of a protocol type from among the plurality of candidate protocol types;

identifying, by the server, a plurality of parameter fields corresponding to the request;

displaying, on the client device, a user interface based on the request, the user interface including the plurality of parameter fields relating to the protocol type corresponding to the request;

receiving, at the server device from the client device, a set of parameter inputs relating to the test script for the plurality of parameter fields;

verifying, by the server device via the client device, the set of parameters inputs in real-time based on a predetermined number of variability and a predetermined format;

receiving, at the server device from the client device, a selection of a testing tool from among a plurality of candidate testing tools displayed on the user interface, the plurality of candidate testing tools determined automatically based on scripting language compatibility between each of the plurality of candidate testing tools and the selected protocol type;

retrieving, by the server, a test script template corresponding to the testing tool; and generating, by the server, a test script based on the test script template retrieved by the server device and the set of parameter inputs received from the client device.

20. A tangible non-transitory computer readable storage medium that stores a computer program, the computer program, when executed by a processor, causing a server device to perform a process comprising:

automatically determining, by the server device, a plurality of candidate protocol types for a user based on a prior testing history of the user and an account profile of the user;

receiving, at the server device from a client device over a communication network, a request from the user for generating a test script, the request including a selection of a protocol type from among the plurality of candidate protocol types;

identifying, by the server, a plurality of parameter fields corresponding to the request;

displaying, on the client device, a user interface based on the request, the user interface including the plurality of parameter fields relating to the protocol type corresponding to the request;

receiving, at the server device from the client device, a set of parameter inputs relating to the test script for the plurality of parameter fields;

verifying, by the server device via the client device, the set of parameters inputs in real-time based on a predetermined number of variability and a predetermined format;

receiving, at the server device from the client device, a selection of a testing tool from among a plurality of candidate testing tools displayed on the user interface, the plurality of candidate testing tools determined automatically based on scripting language compatibility between each of the plurality of candidate testing tools and the selected protocol type;

retrieving, by the server, a test script template corresponding to the testing tool; and generating, by the server, a test script based on the test script template retrieved by the server device and the set of parameter inputs received from the client device.

\* \* \* \* \*